United States Patent [19]
Hollis, Sr.

[11] 3,969,563
[45] July 13, 1976

[54] PROTECTIVE WALL STRUCTURE

[76] Inventor: Russell E. Hollis, Sr., 213 Fenwick Drive, New Carlisle, Ohio 45344

[22] Filed: Oct. 4, 1972

[21] Appl. No.: 294,903

Related U.S. Application Data

[63] Continuation-in-part of Ser. No. 853,811, Aug. 28, 1969, Pat. No. 3,764,277, which is a continuation of Ser. No. 460,309, June 1, 1965, abandoned.

[52] U.S. Cl. ............................... 428/175; 89/36 A; 220/63 A; 428/178; 428/183; 428/186; 428/902; 428/911; 428/912; 428/920
[51] Int. Cl.² ..................... B32B 3/12; F41H 5/04; B32B 3/28
[58] Field of Search ............. 161/69, 133, 134, 139, 161/404, 405; 29/191; 220/63 A; 89/36 R, 36 A, 36 Z; 117/71 R, 46 CC, 46 CB, DIG. 11; 106/56; 428/182, 183, 911, 912, 174, 175, 176, 71, 116, 117, 188, 313, 424, 425, 184, 186, 72, 73, 178

[56] References Cited
UNITED STATES PATENTS

| | | | |
|---|---|---|---|
| 787,065 | 4/1905 | White | 89/36 A |
| 1,995,484 | 3/1935 | Sullivan | 89/36 A |
| 2,405,590 | 8/1946 | Mason | 89/36 A |
| 2,758,952 | 8/1956 | Toulmin, Jr. | 89/36 A |
| 3,203,849 | 8/1965 | Katz et al. | 161/96 |
| 3,217,845 | 11/1965 | Reynolds et al. | 29/191 |
| 3,228,361 | 1/1966 | Ritter | 89/36 A |
| 3,243,313 | 3/1966 | Aves, Jr. | 117/71 R |
| 3,291,333 | 12/1966 | House | 161/405 |
| 3,341,395 | 9/1967 | Weber | 161/133 |
| 3,348,929 | 10/1967 | Valtschev et al. | 29/180 |
| 3,395,105 | 7/1968 | Washburn et al. | 161/185 |
| 3,431,818 | 3/1969 | King | 161/DIG. 5 |
| 3,476,586 | 11/1969 | Valtchev et al. | 117/71 R |
| 3,506,224 | 4/1970 | Harr et al. | 161/405 X |
| 3,559,210 | 2/1971 | Hansen | 161/404 |
| R27,111 | 3/1971 | Wilson | 106/56 |

*Primary Examiner*—William J. Van Balen
*Assistant Examiner*—Charles E. Lipsey
*Attorney, Agent, or Firm*—Jerome P. Bloom

[57] ABSTRACT

A wall structure characterized by inner and outer wall coverings and positioned therebetween at least one protective inner layer defined by a rib-like formation defining a series of pocket-like spaces between said wall coverings, which spaces embody a protective medium forming with the rib-like formation and said wall coverings a wall structure which is highly resistant to impact, fragmentation or severe damage by piercing. The rib-like formation is of a material selected from the group consisting of precipitation hardening stainless steels, mar-aging nickel steels, alloy steels and titanium alloys and having a yield strength of at least about 200 ksi. The protective medium may include a fire quenching material.

13 Claims, 11 Drawing Figures

PROTECTIVE WALL STRUCTURE

REFERENCE APPLICATIONS

This application is a continuation-in-part of U.S. Ser. No. 853,811 filed Aug. 28, 1969 for METAL COMPOSITES, now U.S. Pat. No. 3,764,277, issued Oct. 9, 1973, and U.S. Ser. No. 460,309 filed June 1, 1965, the latter being now abandoned in favor of the former.

BACKGROUND OF THE INVENTION

This invention relates to metal composites in such forms as sheet, plate, tube or roll which serves as hollow shells, for transporting or containing material as coverings, walls, armor, self-sealing casings and reinforcement elements for cloth layers, paper layers and plastic material, all of various shape, sizes and thicknesses.

There is considerable need in the industrial field for a composite or "made up structure" of metal, as distinguished from solid metal, which has a hard and wear resistant surface, resists impact, and still retains the inherent advantage of light weight. From a design and structural standpoint, the composite must have a high strength to weight ratio, substantial resistance to compression forces and bullet impact and, in certain forms, can be flexed or bent to shape. Metallurgically, such materials as the mar-aging and alloy steels, precipitation hardened stainless steels and various titanium alloys have been found suitable as they possess the necessary physical and mechanical properties. However, heretofore the prior art has been unable to get these materials to respond to the wire drawing and meshing contemplated herein, without adversely affecting or weakening the wires.

With this limitation, the prior art had to content itself in the production of screen meshing with the less exotic materials. However, from the discussion to follow, it will be evident that the present invention has found a way to overcome the limitation so as to yield a composite structure not known in the prior art.

SUMMARY OF THE INVENTION

The composite structure which forms the preferred embodiment of this invention is based upon the use of a diagonal truss work between pairs of plates or foils so arranged that the effect of any stress applied to the outside plate or foil would be absorbed as a compressional force on the diagonal members of the intervening truss work. The improved composite, which is constructed primarily of the super-strength metallic alloys having yield strengths in excess of 200 ksi, also takes advantage of the proven premise that two plates rigidly separated from one another can withstand a sudden impact or rupture of one or both plates much more readily than if the latter were in contiguous relationship. The spaced plates feature, having the network of wire meshing therebetween, when coupled with the use of the super-strength metallic alloys gives rise to the high strength to weight ratio of this composite.

DETAILED DESCRIPTION OF PREFERRED EMBODIMENTS

Figure 1:
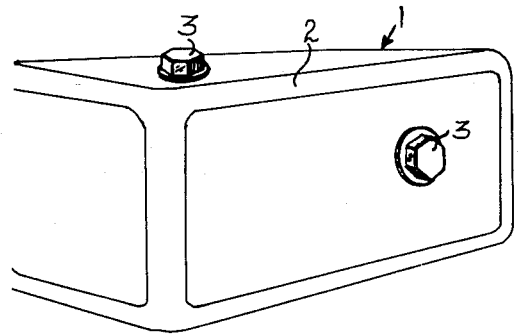
FIG. 1 is a perspective view of a typical container which utilizes the composite structure in the wall construction thereof.

Turning now to a more detailed consideration of the invention, it will be observed in FIG. 1 that reference character 1 designates a typical container whose walls may be constructed from the composite to be described herein. Such a container may be used for liquids such as gasoline or oil, necessitating that the container have a ruggedness of construction, lightness of weight, and resistance to distortion of shape and positive leakproofness. As indicated previously, the improved composite described herein is an ideal material for the wall construction of such a container. The wall portions are preferably welded together by high frequency current at 450,000 c.p.s. applying rounded metal strips 2 so that no corners are present. Usual inlet and outlet openings, closed by screw plugs 3, are provided.

Figure 2:
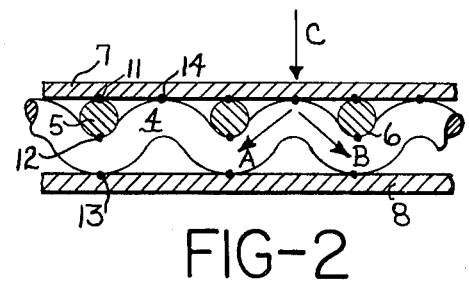
FIG. 2 is a sectional view of one embodiment of a composite constructed according to the teachings herein.
Figure 3:
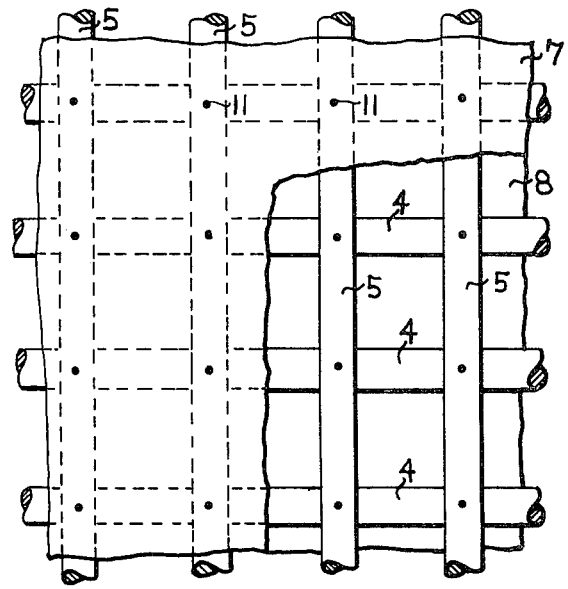
FIG. 3 is a plan view, with a portion of the upper plate removed to expose the wires, of the embodiment shown in FIG. 2.

One form the improved composite structure may take is shown in FIG. 2. A wire 4 is crimped or bent in a uniform wavy manner and a number of these wires are laid in spaced relationship parallel to one another as shown in FIG. 3. While it may not be evident at this point, this relationship of the wires should be contrasted with the more typical woven or twisted wires which are known to cause problems in the final structure. Other wires but of rectilinear shape and having approximately the same diameter as the wires 4 are dropped into the troughs of the bent wires so that one series of wires will be extending in the longitudinal direction and the other wires extending in the transverse direction, crisscross fashion, with one set lying on top of the other set and received by the rounded troughs of the other set. The best results are obtainable when the longitudinal axis A [FIG. 2] of one bent portion of each wave portion of a wire 4 is at 90° with respect to the axis B in the adjacent oppositely bent portion. As shown in FIG. 2, the curvature at the troughs indicated at 6 is such as snugly to receive the rectilinear wires. For an alternate maximum strength in all directions, these wire Forms should best be joined with each layer at 45 degrees to the other layer. Metal plates or foils 7, 8, are then laid along the upper and lower surfaces respectively of the wire construction to provide a sandwich effect. It will be noted that with the proper size of the wires 4, 5, and the proper curvature given to the wire 4, the plates 7, 8, will lie evenly along the upper and lower surfaces of the sandwich construction, touching the uppermost tangential position on each of the wires 4, 5, and also at the lowermost tangential positions. At these positions, in vertical lines coinciding with an intersecting contact between wires 4 and 5, spot welds or brazed joints are effected as indicated at 11, 12, 13, these welds being in vertical alignment with one another so as to hold all parts of the structure rigidly in place. These welds may be provided in any suitable and well-known manner, for example, by means of a gang of short projecting welding electrodes positioned predetermined distances apart, both longitudinally and transversely, according to the points of contact between each of the uppermost and lowermost surfaces of the wires and the contiguous portions of the plates 7, 8. The composite length may also be received by welding rolls which serve to fuse the metal at each point of contact by high frequency current. The weld is performed by "resistant" heating and the technique employed is determined by the nature of the wires 4, 5, and the plates 7, 8. If desired, a brazing effect can be used, as is well understood in the art. Certain types of welding, brazing or diffusion bonding may require such operations within a vacuum or an inert atmosphere. In one example, when properly carried out, three spot welds, or brazed joints will have been provided in vertical line with one another at each intersection of the wires 4 and rectilinear wires 5 and one spot weld or brazed joint will have been provided as indicated at 14, at the position where the uppermost surface of each wire 4 contacts the upper plate 7. Thus the plates are secured to the network of wires and the latter are secured to one another by means of the joining process. And, one further advantage resulting from the intermeshing arrangement is the absence of twisting of the wires. Twisting affects the useful life of the wire involved.

The wires 4, 5, and the plates or foils 7, 8, may take any diametral dimension and thickness, provided the straight wires are properly nested within the troughs of the bent wires to present an even surface at the upper and lower faces thereof in order that the plates 7, 8, may lie strictly flat. Heretofore, one of the major difficulties was in finding suitable materials and to render them usable for the intended purpose. However, the present invention has discovered a way of economically producing high strength metallic wire so as to bring it to a condition suitable for forming into an intermeshed wire network as described. When reference is made herein to alloys cited for wires and plates, it is noted that the invention contemplates preferably that they be fabricated from electron beam vacuum melted steel. In this way the invention provides material of maximum purity, free from inclusions. This enables superior grade qualities, performance and fabrications of the noted articles. Specifically, this invention contemplates the use of wires and strip of precipitation hardening stainless steel, alloy steels, titanium alloys, and maraging nickel steels. This latter steel for example, has a nickel content from about 6–18% by weight, and is readily procurable on the market. It is noted for its high yield strength, up to about 350 ksi, which is particularly important in the case of composites of small overall thickness, also for its relatively high ductility, but more especially for its fracture toughness which is especially important in case the composite is to be used as an impact shield for military purposes. In addition, mar-aged steel has excellent weldability, without post heat treatment, and may be readily formed to shape, which is important in the case of wire 4 that has to be bent to a particular pattern. I have obtained excellent results when constructing composites of small thickness, approximately 0.030 inches overall, employing wire or fibers of 0.005 inches diameter and foils of approximately 0.010 inches. Composites, even of this minute thickness, have tremendous impact-energy absorption and, therefore, are suitable for light armor work, especially for constituting the walls of a fuel tank, when used in conjunction with a self-sealing core structure, and may be positioned on a plane or helicopter and subjected to small arms fire. However, it will be understood that the use of the composite is not restricted to the military field, but in larger thicknesses and sizes may be used in the construction of railroad cars, large tonnage units for domestic and overseas "containerized" shipping now coming into great common usage, automobile bodies, truck bodies, small naval craft, also for floors, panels, prefabricated house panels, bathroom panels, vapor condensers and lubricating oil coolers, in fact, in any place where walls of light weight but extremely tough construction, not easily distorted by sudden impact, are required.

The high strength wire to be used herein may be processed by the following steps:

1. Select alloy rods, from the class of materials above described, on the order of 0.062 inches diameter.
2. Coat bundled rods with glassy silica to provide high temperature lubrication.
3. Heat the bundled rods to a temperature on the order of 1650° – 1850°F. by means of induction heating coils in series. The hard pulling of heated wire between one heating coil and another serves to stretch and reduce wire diameter (rod).
4. Pass the heated and coated rods through a die which may be carbide or alumnia, to reduce same to about 0.010 inches diameter, or the reduction may be continued to a final smaller size such as 0.003 inches. Reheating may be utilized to reduce the work hardening which is normally incident to cold high speed alloy wire drawing.
5. Optionally supplement the drawing by passing said reduced wires between high pressure rolls to create a flattened condition.
6. Aging or stress-relieving the alloy at temperatures on the order of about 800° – 900°F. for about 1 to 4 hours, or as may be required for the respective alloys, and quenching, where desired, in oil or water, where so indicated in order to attain potential 600K psi/U.T.S. in high alloy fine wires.
7. Subject the stress-relieved or aged wire to shot peening to remove any remaining residual stresses.

While I do not wish to be limited to any theory as to why the improved truss core type of composite of the invention exhibits an extraordinarily high degree of impact absorption, I believe it is on account of the fact that any impact that strikes the upper plate 7 at zero obliqueness, indicated by the arrowed line C in FIG. 2, causes the stress to be divided along the 45 degree angle downwardly along the axis A, B, in both directions through the wire 4 and thus place the metal of the wire in both directions under compression. The compression strength of the high strength alloys contemplated herein, particularly when mar-aged steel is used, is enormous so that the impact force is absorbed within the upwardly and downwardly curved portions of the wire assuming that the point of impact is applied at the position of the weld 14. While the optimum strength presented by the wire core is obtained when the ascending and descending portions of the wire 4 are positioned approximately at 45°, it will be understood that correspondingly enhanced strength is obtainable at angles greater than or less than the 45° optimum.

The impact resistance of the composite is also enhanced by the fact that the plates 7, 8, are spaced from one another by the intervening truss work, The separation of plates with high strength alloy mesh, which alloys possess a yield strength in excess of 200 ksi, also causes deflection and tumbling by projectiles, thus reducing the penetrative capacity while absorbing energy. It is well known that two plates separated from another offer a greater resistance to penetration, for example by a bullet or meteoroid, than would be the case if the two plates were in close contiguous relationship or even integral with one another. Consequently, the high strength wire core of the composite serves not only to absorb the force of the impact by dividing this force into two directions at right angles to one another as explained above, but also affects deflection and disintegration of cracked penetrating projectiles. Structures of the type described are particularly beneficial for the holds of ships where the latter are apt to strike obstructions and require complete freedom from distortion of shape, assuming that the various parts of the composite are made of the proper dimension and sizes as would provide the necessary overall thickness of hull. For reasons and by techniques to be explained hereinafter, the composite may include a self-sealing material to eliminate any leakage caused by small punctures.

A further and final feature comtemplated herein to enhance the protective nature of the composite lies in the use of high strength metallic plates of varying hardness and ductility. For example, the upper or outer plate against which the projectile is directed should comprise a metallic alloy of the type described having a hardness on the order of $R_c$ 55–70. This will aid in causing the armor piercing projectiles to crack when impacting at velocites as high as 3350 f.p.s. On the other hand, the bottom or lower plate should comprise a more ductile grade of metal whose hardness may vary from 10–20 $R_c$. By sacrificing hardness for the latter plate, maximum toughness is realized without a material loss in strength. Therefore, any broken pieces of projectile which may reach the lower plate with unspent energy can only result in a dent or deflection, but not a serious crack resulting in the possible destruction of the composite.

The walls of freight cars which are subjected to considerable interior and exterior stresses from the heavy and cumbersome loads and they carry, could advantageously use composites of the type described in view of their lesser immunity from distortion upon impact and toughness of the plates 7,8. Indeed, where large plastic objects require metal reinforcement members, applying thereto the improved structure would have particular beneficial effect provided that the empty spaces in the wire mesh are maintained and not filled with plastic so that the structure could, without impediment absorb the force of impact that might be applied to the exterior of the plastic body.

Figure 4:
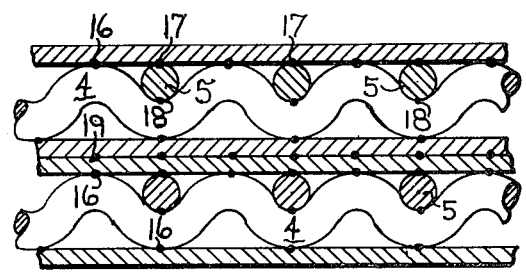
FIG. 4 is a sectional view similar to FIG. 2 but showing a multiple composite.

In FIG. 4, I have shown the manner in which two composites can be associated with one another and spot welded if desired at the various metal contacting surfaces. This embodiment represents one way of providing for a multi-layer composite. It will become evident from the description hereinafter that other multi-layer composites are comtemplated. In any event, these contacting surfaces indicated at 16, 17, 18, 19, may be spot welded in the same manner as was explained in connection with FIG. 2, i.e. by the use of a gang electrode or by welding rollers, using the resistance or thermal form of weld. The double composite shown in FIG. 4 can, of course, be multiplied into three, four or more composite units within the capacity of the welding machine, provided a greater overall thickness of the composite structure is desired, without having to increase the size of the wires of the mesh or the thickness of the plates of foils.

Figure 6:
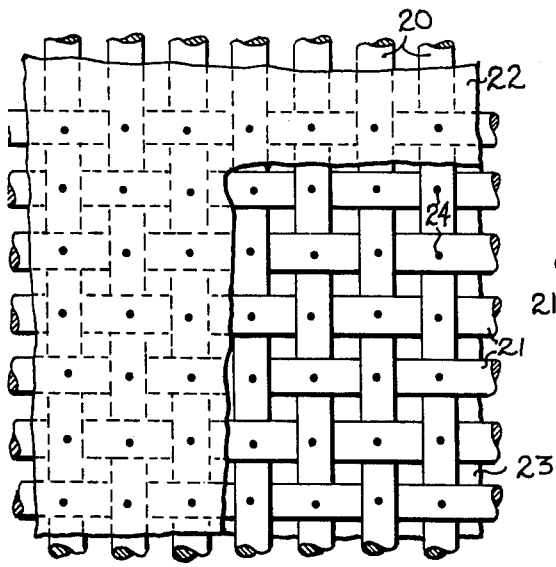
FIG. 6 is a plan view similar to FIG. 3 but showing the structure of FIG. 5.
Figure 5:
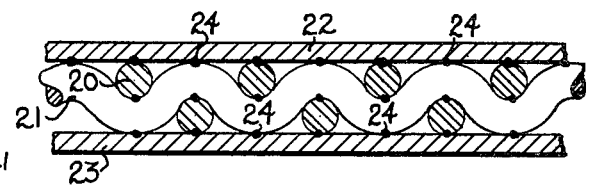
FIG. 5 is a sectional view similar to FIG. 2 but showing further modification thereof.

In FIGS. 5 and 6, I have shown a modified structure of the improved composite in that the wires 20, 21, are each given a bent or a curvilinear shape with reoccurring troughs and crests so arranged that the crests of one set of wires can rest in the troughs of the other set which are positioned at right angles to the first set. Thus, the wires in these figures have an interwoven effect as shown more clearly in FIG. 6 in which one wire, for example, will pass over the trough of the next wire arranged at right angles thereto and then under the crest of still the next wire, etc., so that a woven mat is simulated. Actually, the mesh is formed by welding and not weaving. Insofar as the wires 20, 21 are of the same size and assuming that the bending effect has been predetermined and carefully accomplished, the upper and lower surfaces of the interwoven mat are sufficiently level to receive the plate or foils 22,23. Spot welding can be provided at all the contact points between the wire core and the inside surfaces of the plates 22, 23, as indicated by the dots 24 so that the structure as a whole becomes integral and self-supporting. This structure can be used for many purposes such as a wall. It may be made with an overall thickness as small as 0.030 inches in which case the plate 22 actually becomes a foil 0.010 inches thick and the wires are approximately 0.010 inches in diameter so the latter are more properly termed metallic fibers. On the other, the wires 20, 21, can be of quite considerable diameter and the plate 22 of heavy thickness to make up a composite of considerable overall thickness and strength depending on the particular use of which the structure is put. Here again, the bends in the fibers or wires 20, 21, are predetermined and preferably extend 45° upwardly and downwardy as shown in the Figure between the troughs and the crests so that any impact striking either plate directly over one of the crests would be absorbed as a compressional stress in each of the two contiguous legs of the wire on account of the angularity presented by the wires to the plate. Some of the advantages explained in connection with FIG. 2 in regard to spacing the upper form the lower plate by means of the wire core is still present in the structure of FIG. 5 so that the latter reacts in such a way as to make it difficult for a bullet or meteoroid, for example, to pass each of the plates when using the high strength metallic alloys having yield strengths in excess of 200 ksi, and as high as 350 to 400 ksi.

Figure 7:
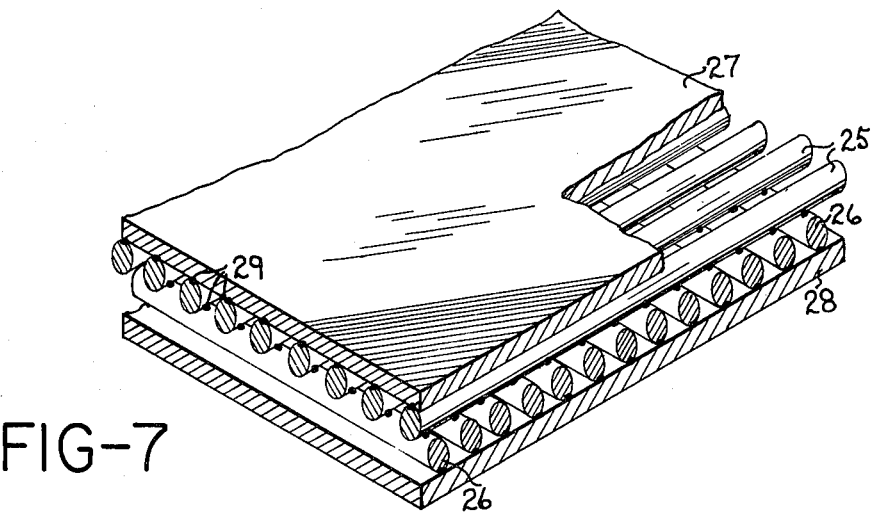
FIG. 7 is a perspective view of a composite structure forming a second embodiment of this invention.

FIG. 7 shows still another form that the improved composite may take. In this figure, the wires 25 preferably all of the same size are laid crosswise in spaced relation on the lower layer 26 of the wires, also equally spaced from one another. The plates 27, 28 are next laid on the top of the wires 25 and also against the lower surfaces of the wires 26, sandwich fashion, and spot welds indicated at 29 are provided throughout the entire area of each of the plates 27, 28, at the places where all of the various metal elements contact one another so that metal wires 25,26 are held securely in place not only with resect to one another but also with respect to the plates. This modification, as in the case of those shown in FIGS. 2 and 5, may be made as thick or as thin as desired depending on its use, the changes being made in the size of the wires or rods 25, 26 and also the thickness of the plate 27, 28. This modification also has the same advantage as was pointed out in connection with FIGS. 2 and 5 in presenting two plates 27, 28 spaced apart, to offer increased resistance to the impact effects of a bullet. Any tendency of the upper plate 27 to move with respect to plate 28 in any planar direction, is resisted by the spot welds holding the various parts together. Notwithstanding the fact that the wires 25, 26, are not anchored in the trough of the adjacent wires as indicated in FIGS. 2 and 5, nevertheless, it has been found that the spot or line weld provided at every contacting point is sufficient completely to prevent the plates from moving in a planar direction with respect to one another. The structure, as a whole, is extremely rugged and is relatively inexpensive to make.

Figure 8:
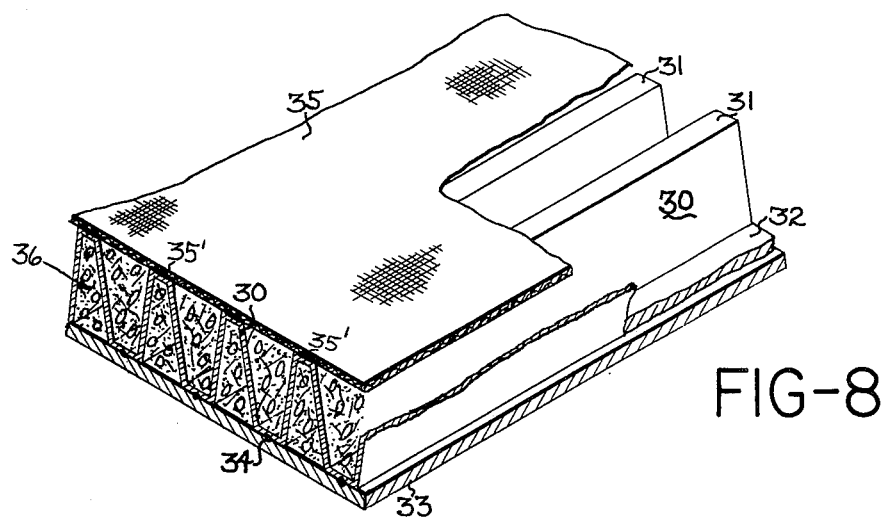
FIG. 8 is a perspective view of a composite structure showing a third embodiment of this invention.
Figure 9:
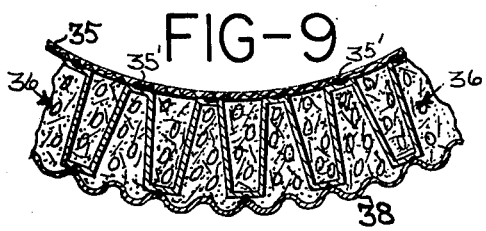
FIG. 9 is a sectional view taken through a curved composite similar to the composite shown in FIG. 8.

In FIGS. 8, 9, I have shown still another form that the metal truss positioned between two plates may take and in which the hollow spaces between the parts of the truss work can be filled with material, generally indicated at 36, that automatically self-seals in the event one or both of the plates should be fractured by a bullet or meteoroid. Referring particularly to FIG. 8, the sandwich or interleaved portion of the composite is formed of a series of angularly shaped strips or ribs indicated at 30 in which the sides of the strips or ribs have a predetermined inclination such as to leave at the top a flat portion 31 and a similarly shaped portion 32 at the bottom. Thus the strip element as a whole can be characterized as having a zig-zag formation extending the entire length of the composite and made of high strength alloy strip such as disclosed herein. There is a lower plate indicated at 33 extending along the lower surface of the portion 32 and spot or line-welded or brazed to the latter in any suitable manner as indicated at 34. While, if desired, a similar plate may extend over the upper portion 31 of the ribs and be spot or line welded, I prefer that the top, particularly in case the composite is to be used as a self-sealing fuel or gasoline tank be made of multi-layer cloth material 35 which may be aluminized for heat deflection. Some suitable cloth materials are the ones sold under the names "NOMEX" and "DACRON" sold by the DuPont Company. Such materials have been fabricated in a honeycomb form in some instance and as so utilized have proven highly desirable for the noted purposes. The cloth layers and/or cloth and plastic film may be secured to the upper portion of the strip or ribs by a layer 35' of silicone resin, vinyl-epoxy, epoxy-elastomer, thermoplastic resin of 175°C. M.P. or any other suitable adhesive.

The multi-layer cloth or cloth with a plastic film mentioned above has particular characteristics as described hereinafter which lends itself to the functions that take place within the composite when a bullet, for example, strikes and perhaps punctures the outer plate 33 of the container. Within the spaces formed by the angular strips, I prefer to insert material indicated generally at 36 which has the facility of self-sealing. For example, this material may comprise a hydrogenated rosin mixed with urethane grade castor oil, up to 50% in prepolymer state, and containing fully dried chopped glass and blue asbestos fibers at 35% of volume in the highly viscous rosin mix. The mixture may also contain multiple catalysts contained within plastic capsules, or fine glass tubes of a small diameter, which are filled to 90 – 95% capacity. The catalyst may take various forms such as toluenedisocyanate, triethylene diamine — "DABCO" [liquid in dipropylene glycol] as a 33.3% solution or dimethyle-thanolomine. As a further accelerator, dibutyl 10 dilaurate or stannous octoate 1% of the total reactive solids may also be used to advantage while 1.5% of the basic catalysts or more should be made available in the encapsulations based upon the total weight of the sealing resinous material.

The plastic capsules or the fine glass tubes are of extremely thin construction so that when a bullet penetrates the outer wall 33 of the self-sealing fuel or gasoline tank, it may leave a jagged opening 36' and pass through the space between one of the angular ribs to emerge out at the cloth-plastic member 35. The bullet or the metal fracture caused thereby will break a number of the tiny catalyst capsules under a crushing impact and the contents will react with the hydrogenated rosin and urethane grade castor-oil mixtures to form a pressurized jelly or even a solid plug indicated at 37 which joins integrally with the cloth-plastic covering 35. This reaction evolves $CO_2$ gas which pressurizes and foams the content to form a polyurethane which may attain a tensile strength of 3807 psi within the mesh ribbed or compartmentalized section. The encapsulations may also be fabricated by using cotton or other textile threads as carriers for the catalyst. These carriers may be fed into fine plastic tubing or glass tubing and then cut to nominal lengths and sealed by any of the well known methods.

For maximum safety in sealing punctured fuel tanks, I prefer to prepressurize the soft sealant in the tank wall with use of $CO_2$ gas at 0.50 psig to help offset the hydraulic pressure caused by weight of fuel.

Consequently, the oil or gasoline located within the tank at the cloth side is prevented from escaping past the composite wall on account of the jelly or plug material formed in the manner stated. It will be further noted that while the cloth member 35 does not have a high impact strength, certainly not as great as if this covering were made of a high strength metal, nevertheless, it does offer high resistance to a moving bullet, particularly if multiple layers are employed, on account of the spaced relation between the cloth layers and the metal plate 33, as explained above. Many slower moving bullets will therefore not be able to penetrate the cloth layers, having passed through the metal layer 33 and their velocity and energy having been reduced. But as to any holes that are produced in the cloth-plastic layers, such holes are immediately closed by the viscous plastic and the chemical reaction of the elements including the released catalysts of the mixture contained within the confines of the affected rib.

In the event a fire is contemplated, such as by an incendiary bullet or an electrical short circuiting, any exposure of flammables to the self-sealing components could be extinguished by reason of contact with the chlorinated biphenyl or brominated compounds to the extent of 3–7% of the resins mixture in the castor-oil polyol.

Figure 10:
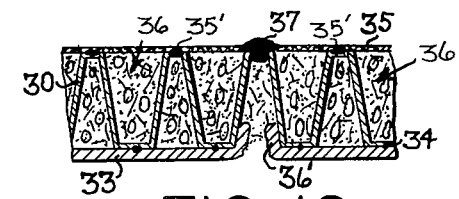
FIG. 10 is a sectional view similar to FIG. 9 but illustrating the typical effect of a projectile impact against the wall thereof.

Further, in the event it is desired to make self-sealing tanks in cylindrical form, the structure shown in FIG. 9 may be used to advantage. In this case, the lower plate 38 is made perhaps a little thinner than the first plate 33 in FIG. 8, and it is also corrugated so as to permit a peripheral expansion and thus allow the composite wall as a whole to assume any degree of curvature desired to form a cylindrical tank. The laminated cloth wall 35 or a cloth and plastic combination, will obviously contract to the desired shape. As indicated in the structure shown in FIG. 10, the tank wall in FIG. 9 has the same facility of self-sealing at the position of the cloth layers. This structure has the same advantage of offering two surfaces i.e., the metal member 38 and the cloth layers 35 which together might serve to slow down a traveling bullet to such extent that the latter may not be able to emerge from the cloth layer or a nylon felt, or graphite fiber composite with nylon. It is noted that layer material may be employed which utilizes carbon or graphite fibers individually electroplated with .065 mils aluminum to enable hot bonding of such fibers together to form stacked layers or yarns having heat reflection capabilities. In a situation where small cylindrical items are to be produced, concentric tubular members may be employed rather than using the larger sections such as discussed above.

In the former situation, it is obvious that the overall thickness between the cloth or nylon felt layers and the lower plate can be made of any desired dimension, even down as low as ⅛ inch and the ribs can be made extremely thin in like manner, and yet the composite as a whole shows remarkable impact strength without adding much weight to the tank made in the manner. These thicknesses and dimensions can of course be multiplied many times as may be necessary and the component parts also increased in thickness along with the viscous fibered mixture content. Extraordinary strength to bullet impact exhibited by the component may be ascribed, as indicated at FIGS. 2 and 4, to the fact that the force of impact is divided between two portions of the ribs 30 which as pointed out hereinabove are set at an angle to one another and with respect to the lower plate 33. This angularity of position also increases the resistance against movement of the plate 33 sidewise with respect either to the cloth or nylon felt cover 35 or with respect to the other portions of the ribs. It is also apparent these ribs need not be made of solid metal but may, if desired, be perforated or perhaps formed of fairly stiff mesh material so as to allow the mixture content between the ribs including the released catalyst to move readily from one space to another without restriction so as to achieve a faster reaction at the puncture opening that need be sealed. This is also enhanced by the $CO_2$ pressurization from the catalyzed polyol reactions.

It is of course obvious that the structures such as shown in 8, 9, and 10 can embody multiple layers of said rib formations and the same may utilize in conjunction therewith interleaved sheet structures or further protective layers or inter layers such as illustrated in other described embodiments of the invention. The composite will be designed to suit the particular application and with the present description the same will be well within the skill of a mechanic versed in the art.

Figure 11:
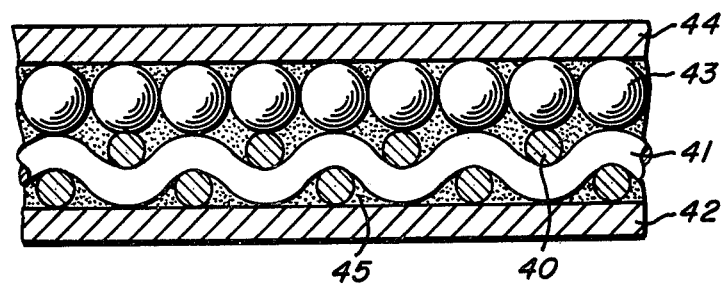
FIG. 11 is a sectional view similar to the above but illustrating a further embodiment of this invention.

A further and final embodiment is illustrated in FIG. 11. While this structure has utility independently of the other embodiment, it is preferred when used in conjunction therewith. For convenience, this improvement has been illustrated with regard to the network structure shown in FIG. 5; however, the other variations are also applicable.

The intermeshed high strength metallic wires 40 and 41 are formed and disposed as shown in FIG. 5 and welded to the lower plate 42. To complete the composite structure, sintered graphite pellets of 94% carbon with 6% Copper/Alumina 4% Vol. as made by an aqueous coprecipitation process of alumina pellets 43 or alternate layers of both are disposed between the network structure of wires 40 and 41 and a top plate 44. These high dense and compact pellets have been found to possess high hardness and good compressive strength. The graphite Cer-Met pellets attain 7.5 ksi to 100 ksi and the Alumina 300 ksi to 500 ksi compressive strengths. These pellets, which have been found particularly effective in defeating armor piercing projectiles, may be provided with a coating or cladding. One particularly suitable cladding is one composed of a first layer of Moly-Manganese 2–3 mils, and a second of coating of Moly-Boride of about 10 mils to 4520 Knoop hardness.

These pellets which may vary in diameter from a small ⅛ inch diameter size up to ½ inch or ¾ inch diameter, are bonded or sintered on to the wire forms or plates. The bonding may be effected by a preferably void filling adhesive such as epoxy-urethane elastomer using 1.5% ceric oxide at 2200°C. Melting Point to enhance high temperature tolerance, or with other heat curing resins. The latter may be cured in situ by the application of electric current to the wire network or electrical thermal conducting reinforcing fibers of metal or carbon. In any case, an effective bonded composite results. In addition to the non-metallic or cermet pellets, compacted sintered alloys containing carbides' grains with titanium, either new or scrap of clean category, and steel or aluminum with fibers may also be used for the pellets. These also may be provided with a coating or cladding to enhance their properties to cause impacting projectiles to crack, disintegrate, and/or tumble, for example one of Chrome up to $R_c$ 70 at 0.015 inches to 0.020 inches thick. As a further example Titanium may be metallided to about 1500 Knoop hardness, steel diffused with Boron up to 4500 Knoop and aluminum sintered with Boron Carbide to about 1600 Knoop hardness.

It will be understood that this invention is susceptible to modification in order to adapt it to different usages and conditions. For example, a multiple layer composite may be constructed using a combination of wires disposed at angles of 90% or less and/or pellet networks intermediate two or more layers or plates, foils or non-metallic layers such as discussed herein. Accordingly, it is desired to comprehend such modifications within this invention as may fall within the scope of the appended claims.

It has been described in reference to preferred embodiments of the invention that multi-layer cloth material be used which is comprised of stacked layers or yarns having an aluminum coating. In certain applications it will be advantageous that there be added to the aluminum coating a further coating (commencing at 1.0 mil. thick) of ceric oxide having a 2200°C. Melting point in combination with graphite powder or microspheres in a binder of petroleum pitch of 95% carbon. The latter will convert to solid carbon and graphite at highly elevated temperatures from 1000°C. to 2000° C. in an inert atmosphere or vacuum.

Having thus described my invention, I claim:

1. A protective wall structure comprising spaced wall elements including an inner wall element and an outer wall element, said outer wall element being metallic and said inner wall element comprising a multi-layer cloth material, rigidifying means formed of a material selected from the group consisting of precipitation hardened stainless steel, mar-aging nickel steels, alloy steels and titanium alloys having a yield strength of at least about 200 ksi, said rigidifying means being positioned between and contacting said wall elements and forming therewith separated interior spaces, said rigidifying means having a truss-like, zig-zag form including angularly shaped segments which are inclined with respect to one another and to said wall elements, and organic polymerizable material occupying said separated interior spaces together with catalyst means enclosed in rupturable casing means, said casing means preventing contact between said polymerizable material and said catalyst means, the environment of said polymerizable material, including such portions of said catalyst means released on a break of a portion of said rupturable casing means by means producing one or more apertures in said wall elements, being pressurized and said polymerizable material and the portions of said catalyst means released from the casing having the property to co-act on contact to produce a sealant forming a pressurized plug of the one or more apertures in said wall elements.

2. A protective wall structure as in claim 1 wherein the environment of said polymerizable material and said catalyst means in said separated interior spaces is pre-pressurized.

3. A protective wall structure as in claim 1 characterized in that the pressurized environment is provided by the property of the constituents included in said polymerizable material and said catalyst means to evolve, on contact therebetween, a gas which produces said pressurized environment for the mixture of materials and influences them to form said pressurized plug.

4. A protective wall structure as in claim 1 wherein said polymerizable material comprises a viscous resin and fiber mix, selected to react, on release of said catalyst means and contact therewith, to change the form of said polymerizable material to a jelly which is pressurized.

5. A protective wall structure as in claim 1 wherein said polymerizable material comprises a hydrogenated rosin mixed with urethane grade castor oil up to 50% in prepolymer state.

6. A protective wall structure as in claim 1 wherein said multi-layer cloth material has a metallic exterior coating.

7. A protective wall structure according to claim 1 wherein said outer wall element has a non-planar configuration providing it with a form permitting a peripheral expansion of the outer surface of said protective wall structure.

8. A protective wall structure according to claim 1 wherein said multi-layer cloth material has an aluminum coating.

9. A protective wall structure according to claim 8 wherein said aluminum coating is provided by the embodiment of individual aluminized fibers in said cloth material.

10. A protective wall structure according to claim 8 wherein said cloth material has a further coating of ceric oxide combined with graphite in a binder of petroleum pitch, said coating being converted by heating to 1000° to 2000°C.

11. A protective wall structure according to claim 1 wherein said rigidifying means is made of a titanium alloy containing carbide grains.

12. A protective wall structure according to claim 1 wherein said polymerizable material has combined therewith a fire extinguishing means.

13. A protective wall structure as in claim 1 characterized in that said inner wall element comprising said multi-layer cloth material embodies carbon or graphite fibers coated with aluminum.

* * * * *